United States Patent
Kluchnikov et al.

(10) Patent No.: US 10,095,623 B2
(45) Date of Patent: *Oct. 9, 2018

(54) HARDWARE APPARATUSES AND METHODS TO CONTROL ACCESS TO A MULTIPLE BANK DATA CACHE

(71) Applicant: Intel Corporation, Santa Clara, CA (US)

(72) Inventors: Andrey Kluchnikov, Moscow (RU); Jayesh Iyer, Bangalore (IN); Sergey Y. Shishlov, Moscow (RU); Boris A. Babayan, Moscow (RU)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/297,084

(22) Filed: Oct. 18, 2016

(65) Prior Publication Data

US 2017/0039139 A1    Feb. 9, 2017

Related U.S. Application Data

(63) Continuation of application No. 14/498,902, filed on Sep. 26, 2014, now Pat. No. 9,471,501.

(51) Int. Cl.
*G06F 12/00*    (2006.01)
*G06F 12/0844*    (2016.01)
(Continued)

(52) U.S. Cl.
CPC ........ *G06F 12/0844* (2013.01); *G06F 3/0613* (2013.01); *G06F 3/0637* (2013.01);
(Continued)

(58) Field of Classification Search
None
See application file for complete search history.

(56) References Cited

U.S. PATENT DOCUMENTS 5,323,489 A    6/1994    Bird
5,703,822 A *  12/1997   Ikeda ................... G11C 7/1018
                                              365/221

(Continued)

OTHER PUBLICATIONS

Sohi et al., "High-Bandwidth Data Memory Systems for Superscalar Processors", Computer Science Department, University of Wisconsin-Madison, copyright 1991 ACM 0-89791-380-/91/0003-0053, pp. 53-62.

*Primary Examiner* — Brian Peugh
(74) *Attorney, Agent, or Firm* — Nicholson De Vos Webster & Elliott LLP

(57) ABSTRACT

Methods and apparatuses to control access to a multiple bank data cache are described. In one embodiment, a processor includes conflict resolution logic to detect multiple instructions scheduled to access a same bank of a multiple bank data cache in a same clock cycle and to grant access priority to an instruction of the multiple instructions scheduled to access a highest total of banks of the multiple bank data cache. In another embodiment, a method includes detecting multiple instructions scheduled to access a same bank of a multiple bank data cache in a same clock cycle, and granting access priority to an instruction of the multiple instructions scheduled to access a highest total of banks of the multiple bank data cache.

24 Claims, 12 Drawing Sheets

(51) Int. Cl.
*G06F 12/0875* (2016.01)
*G06F 3/06* (2006.01)
*G06F 12/0811* (2016.01)
*G06F 12/084* (2016.01)
*G06F 12/0842* (2016.01)
*G06F 13/18* (2006.01)
*G06F 9/52* (2006.01)

(52) U.S. Cl.
CPC .......... *G06F 3/0659* (2013.01); *G06F 3/0673* (2013.01); *G06F 12/084* (2013.01); *G06F 12/0811* (2013.01); *G06F 12/0842* (2013.01); *G06F 12/0875* (2013.01); *G06F 9/52* (2013.01); *G06F 13/18* (2013.01); *G06F 2212/1008* (2013.01); *G06F 2212/1016* (2013.01); *G06F 2212/251* (2013.01); *G06F 2212/452* (2013.01)

(56) References Cited

U.S. PATENT DOCUMENTS

| | | | |
|---|---|---|---|
| 5,924,111 A | 7/1999 | Huang et al. | |
| 6,549,991 B1* | 4/2003 | Huang | G06F 13/1626 711/105 |
| 6,671,836 B1* | 12/2003 | Lai | G11C 29/1201 714/718 |
| 7,370,161 B2 | 5/2008 | Kim et al. | |
| 2005/0132146 A1* | 6/2005 | Kim | G06F 13/1647 711/151 |
| 2007/0223293 A1* | 9/2007 | Fekih-Romdhane | G11C 29/26 365/201 |
| 2009/0204780 A1* | 8/2009 | Kondo | G11C 7/1006 711/168 |
| 2011/0066821 A1* | 3/2011 | Rijshouwer | G11C 7/1006 711/165 |

* cited by examiner

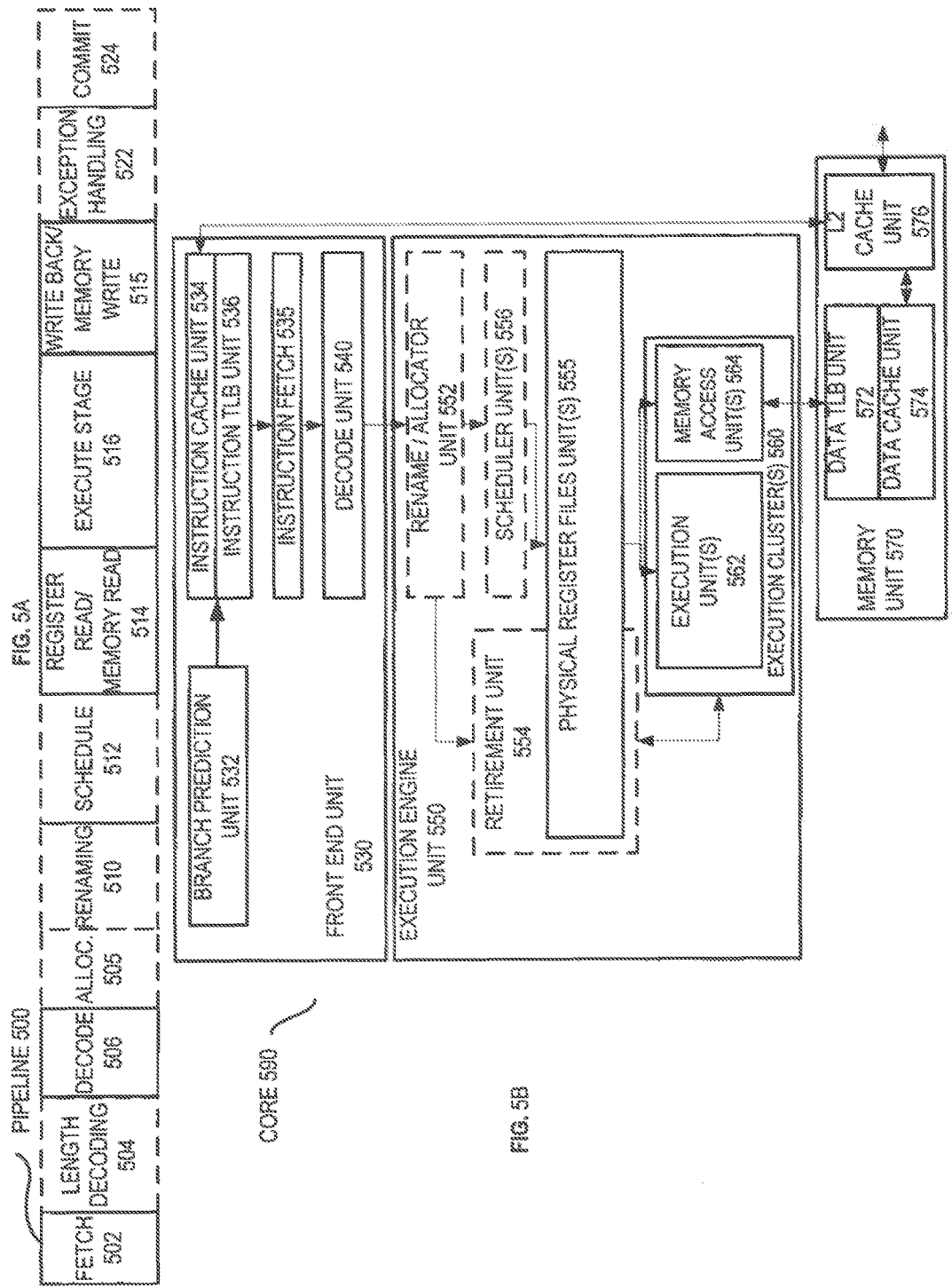

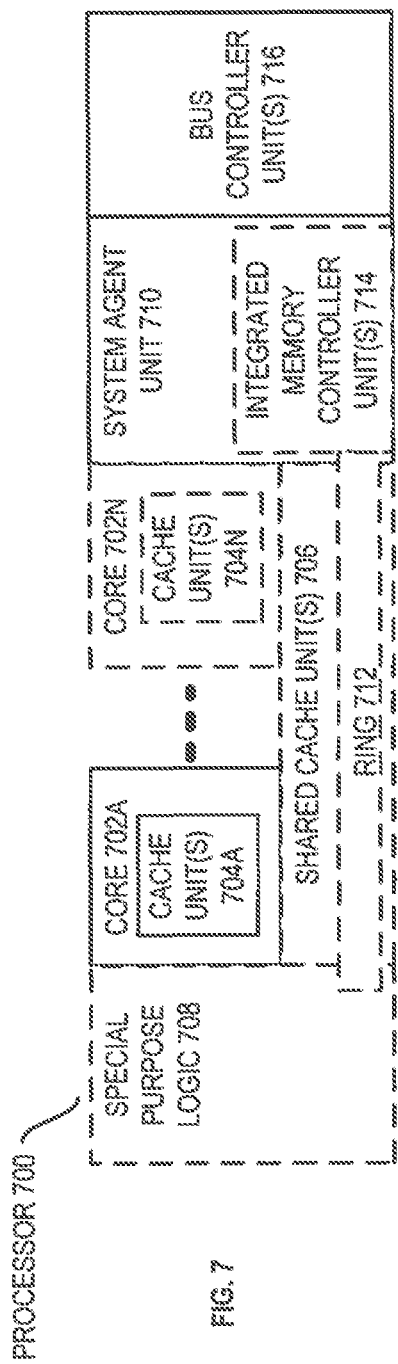

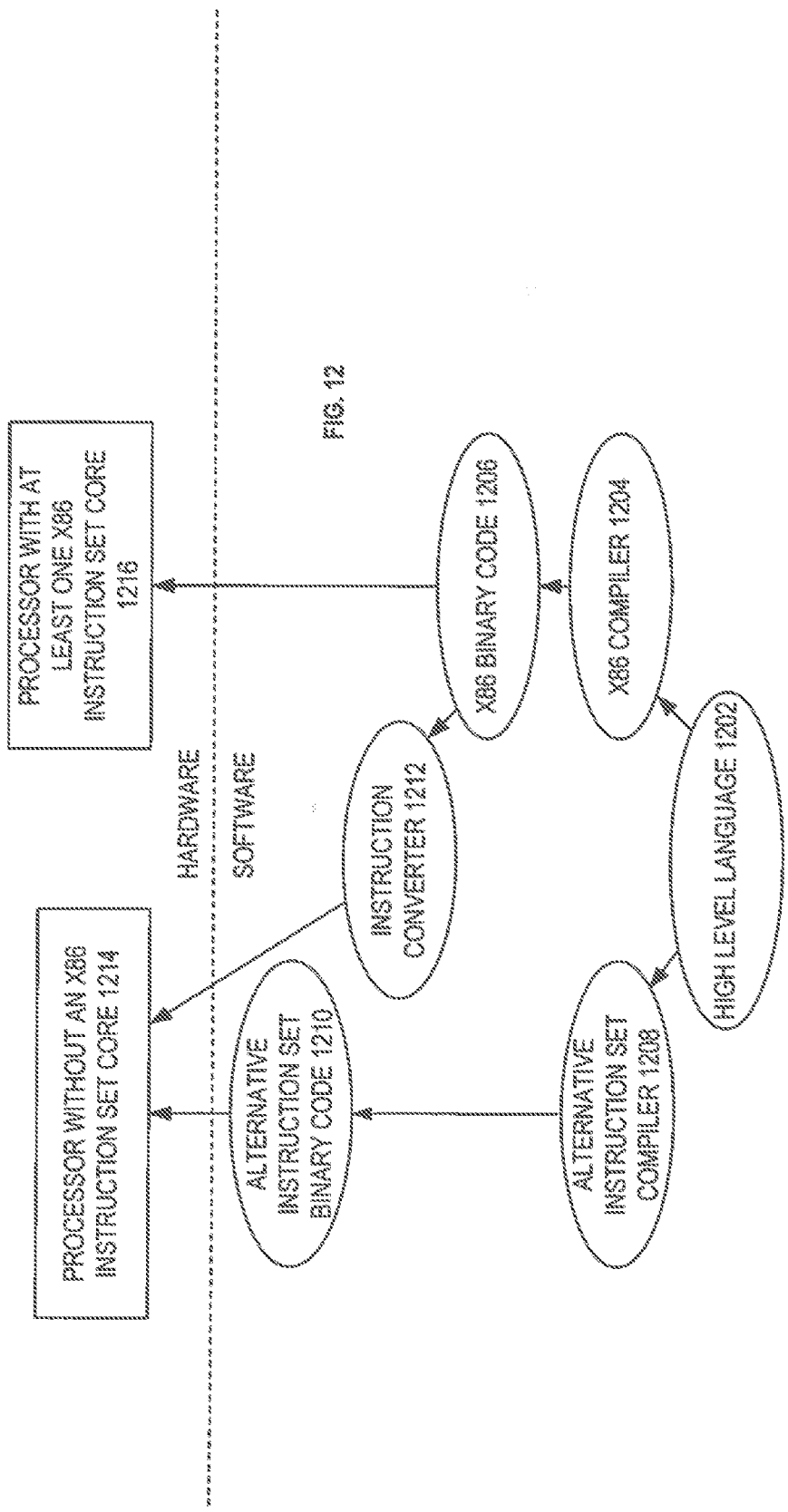

HARDWARE APPARATUSES AND METHODS TO CONTROL ACCESS TO A MULTIPLE BANK DATA CACHE

CROSS-REFERENCE TO RELATED APPLICATIONS

The present patent application is a continuation application claiming priority from U.S. patent application Ser. No. 14/498,902, filed Sep. 26, 2014, now U.S. Pat. No. 9,471, 501, and titled: "Hardware Apparatuses and Methods to Control Access to a Multiple Bank Data Cache", which is incorporated herein by reference in its entirety.

TECHNICAL FIELD

The disclosure relates generally to a multiple bank data cache, and, more specifically, to controlling access to a multiple bank data cache.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 5A is a block diagram illustrating both an exemplary in-order pipeline and an exemplary register renaming, out-of-order issue/execution pipeline according to embodiments of the disclosure.

FIG. 5B is a block diagram illustrating both an exemplary embodiment of an in-order architecture core and an exemplary register renaming, out-of-order issue/execution architecture core to be included in a processor according to embodiments of the disclosure.

FIG. 7 is a block diagram of a processor that may have more than one core, may have an integrated memory controller, and may have integrated graphics according to embodiments of the disclosure.

FIG. 12 is a block diagram contrasting the use of a software instruction converter to convert binary instructions in a source instruction set to binary instructions in a target instruction set according to embodiments of the disclosure.

DETAILED DESCRIPTION

Figure 1:
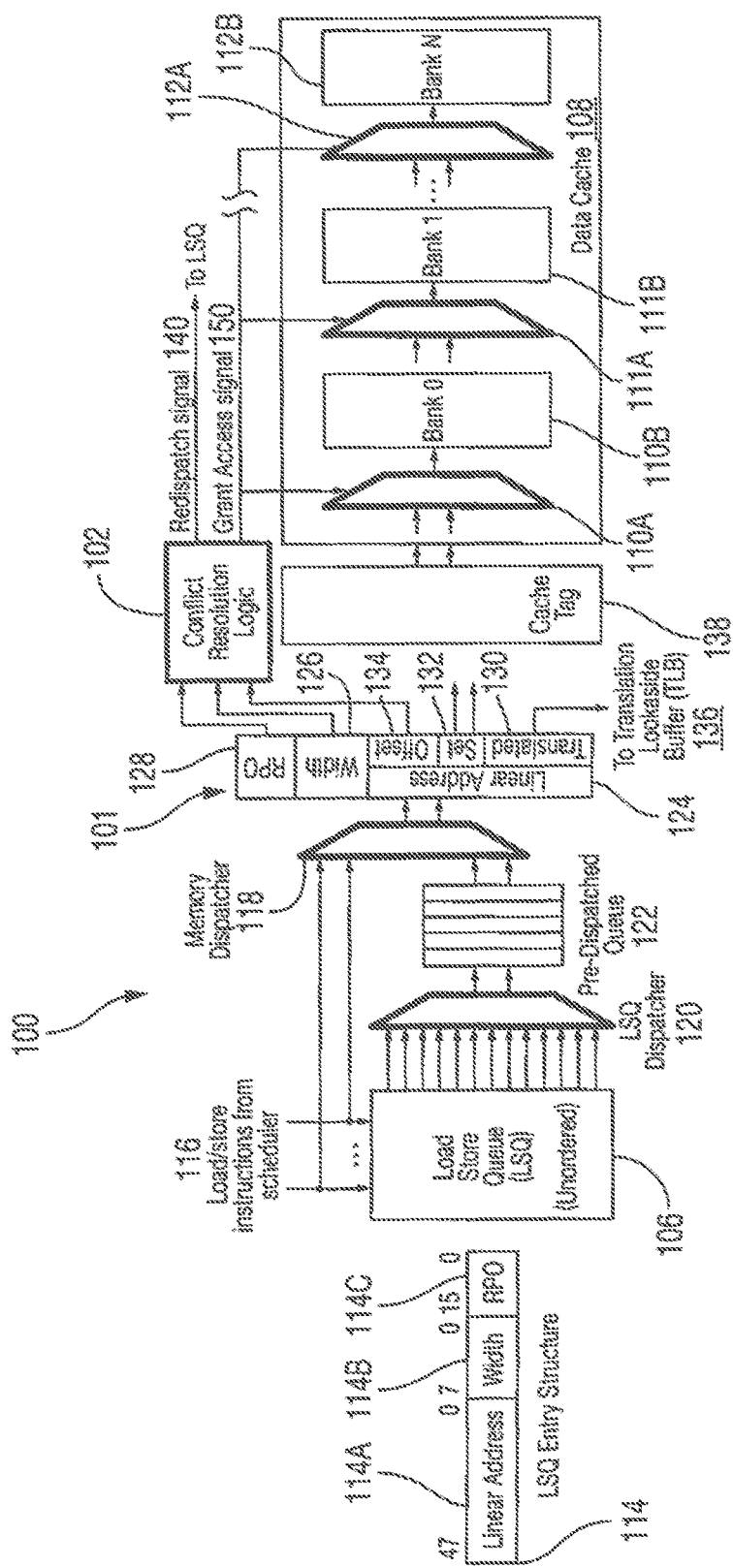
FIG. 1 illustrates an embodiment of a circuit including conflict resolution logic.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For instruction processing hardware (e.g., a processor having one or more cores to execute instructions), it may be desirable to utilize the available instruction level parallelism (ILP) as well as execution resources to maximize performance. A higher throughput for memory access operations (e.g., a higher rate of successful memory access, such as, but not limited to, loads and/or stores) may be desirable, for example, where a lower memory (e.g., data cache) access throughput may become a bottleneck for performance as it may stall the execution of dependent instructions in the hardware. A multiple bank (e.g., multi-banked and/or interleaved) data cache may be used by a (e.g., superscalar) processor to allow execution of more than one instruction (e.g., a load and/or store instruction) in a single clock cycle. In an embodiment, each bank of the multiple bank data cache may have only one access port, e.g., allowing for a lower access latency in comparison with multi-ported structures. In one embodiment, if the instructions that are scheduled (e.g., issued) for execution in the same (e.g., single) clock cycle cumulatively access data located in different banks, all of these instructions may execute in parallel. In one embodiment, if two or more simultaneously scheduled (e.g., issued) instructions are to access data located in at least one of the same banks in the same clock cycle, it will result in a bank conflict and only one of these instructions may be selected for access to the conflicted bank of the multiple bank data cache, while the other(s) instructions may be dispatched again at a later time (e.g., canceled from accessing the conflicted bank or any bank of the multiple bank data cache in that same clock cycle). In certain embodiments, e.g., to achieve the highest processor performance, apparatuses and methods of this disclosure may grant access priority to an instruction that lies on the microarchitectural critical path of execution. In one embodiment, an out-of-order processor (e.g., fetch architecture) is different from an in-order processor (e.g., fetch architecture) in that the scheduling window may not include instructions in their program order. An out-of-order scheduling window may be filled by dependent instructions of the younger instruction while dependents of the older instruction have not been fetched yet. Thus it may be undesirable to merely grant access priority to the older instruction in some embodiments.

FIG. 1 illustrates an embodiment of a circuit 100 including conflict resolution logic 102. Hardware circuit 100 may include fewer or more features than illustrated without departing from the disclosure. For example, circuit 100 may be part of an integrated circuit, for example, a (e.g., out-of-order) processor. Depicted circuit 100 includes a load store queue (LSQ) 106. LSQ may be unordered or otherwise ordered. While circuit 100 is illustrated with load and store instructions, such a circuit and method may be utilized for only load instructions (e.g., loads) or for only store instructions (e.g., stores). Circuit 100 may be utilized with any instruction that accesses a data cache (e.g., memory), for example, a multiple bank data cache. Circuit 100 may be utilized with independent instructions. Circuit 100 may be utilized with any instructions that attempt to concurrently (e.g., simultaneously) access a data cache (e.g., memory), for example, a multiple bank data cache. LSQ may be any queue for storing information corresponding to instructions that access a data cache. Depicted multiple bank data cache 108 includes a plurality of banks (e.g., 0, 1, . . . N). Each bank (110B, 111B, 112B) may include a selection device, e.g., depicted multiplexers (muxes) (110A, 111A, 112A; accordingly) to allow access to that specific bank. A data cache may be cache memory (e.g., of any level, such as, but not limited to, L1, L2, L3, etc.), system memory, or combinations thereof. Data cache may be shared by multiple cores of a processor or local (e.g., not shared) to each core of a processor.

Depicted LSQ 106 includes an entry structure 114 of a linear address 114A, an access width 114B, and a relative program order 114C (RPO) (e.g., age of the instruction relative to the other pending instructions or an independent age of the instruction). Any entry structure may be utilized herein. For example, entry structure for entries into an LSQ may include any direct value or a value that indicates the direct value. Entry structure 114 may include a linear address 114A, an access width 114B, a relative program order 114C, or any combinations thereof. Entry structure may include a linear address (as shown), a virtual address, a physical address, or any combination thereof. In one embodiment, an LSQ entry includes (e.g., directly or indirectly) the bank or banks that the corresponding instruction is scheduled (e.g., dispatched) to access.

Instructions (e.g., load and/or store instructions) 116 that are to access the data cache 108 may be input into the queue (e.g., LSQ 106) and/or into the conflict resolution logic (e.g., 102 or 202). In one embodiment, the instructions (e.g., load and/or store instructions) 116 that are to access the data cache 108 are dispatched from a scheduler. One example of a scheduler is scheduler unit(s) 556 in FIG. 5B.

Depicted load store queue 106 sends instructions to the LSQ dispatcher 120. The depicted LSQ dispatcher 120 (e.g., logic) may select non-completed (e.g., load and/or store) instructions from the LSQ 106 as candidates to send (e.g., for dispatch) to the data cache access ports (e.g., via muxes 110A, 111A, 112A). The selection may be performed based on any of multiple possible algorithms, such as selecting the least recently allocated instruction (e.g., load and/or store), oldest instruction (e.g., load and/or store) in the program order, random non-completed instruction (e.g., load and/or store), or any other algorithm. The selected candidates may be arbitrated with other sources of requests to the data cache, such as other instructions that access the data cache. Depicted LSQ dispatcher 120 includes a multiplexer (mux) which may select (e.g., via a selection signal) a certain number (e.g., less than all) of instructions (e.g., two) among all LSQ 106 entries. Control logic (e.g., as part of conflict resolution logic and/or part of LSQ dispatch logic) may control the multiplexer, e.g., output the selection signal to the multiplexer. Control logic may use one bit per each instruction to indicate whether that instruction is completed. In one embodiment, based on this bit, the LSQ dispatcher 120 may select (e.g., from) only non-completed instructions. In certain embodiments, the control logic may use alternative or additional inputs to select a certain number of instructions to dispatch from the LSQ 106 instruction entries, for example, using input(s) of the time when each instruction was written to the LSQ and/or their RPOs, e.g., to prioritize certain (e.g., older) instructions over the others. Additionally or alternatively, instructions may be prioritized (e.g., by the LSQ dispatcher) based on the physical positions of instructions at the multiplexer inputs, or randomly, or using any other algorithm.

Depicted LSQ dispatcher sends (e.g., for dispatch) instruction(s) to the pre-dispatched queue 122. Memory dispatcher (e.g., depicted mux 118) may select a plurality (depicted as two) of instructions (e.g., load and/or store instructions) that are (e.g., scheduled) to (e.g., simultaneously) access the data cache 108, for example, see the dual arrows exiting from the depicted memory dispatcher mux 118. Depicted memory dispatcher 118 may select one or more instructions from a scheduler (e.g., at 116) and/or pre-dispatched queue 122. Depicted memory dispatcher 118 includes a multiplexer (mux) to select a certain number of instructions (e.g., two) from the instructions in the pre-dispatched queue 122 (e.g., those which were previously selected by the LSQ dispatcher 120) and/or instructions dispatched from the instruction scheduler 116. The multiplexer may be controlled by control logic (e.g., as part of conflict resolution logic and/or as part of memory dispatcher logic). The control logic may use input(s) of validity bits of each instruction dispatched from the scheduler and/or of each instruction in the pre-dispatched queue 122. Memory dispatcher may select instructions only from a scheduler, for example, when there are no instructions pending in an instruction queue, e.g., no instructions pending in the LSQ 106 and/or pre-dispatched queue 122. Memory dispatcher may select instructions only from a scheduler, for example, when the instruction queue (e.g., LSQ 106) contains less non-completed instructions (e.g., loads and/or stores) than the number of data cache access ports (e.g., "N" in FIG. 1), the instructions (e.g., loads and/or stores) issued and/or stored (e.g., by the scheduler or other instruction queue, such as, but not limited to, LSQ 106 and/or pre-dispatched queue 122) may bypass the instruction queue (e.g., LSQ 106 and/or pre-dispatched queue 122) and participate in the arbitration for access to the data cache ports directly (e.g., via conflict resolution logic) without being selected by the instruction queue (e.g., LSQ 106 and/or pre-dispatched queue 122) and/or memory dispatcher 118.

Conflict resolution logic (e.g., 102 or 202) may receive a plurality of instructions (e.g., multiple instructions scheduled to access a same bank of the multiple bank data cache in a same clock cycle). For example, conflict resolution logic (e.g., 102 or 202) may receive all plurality of instructions (e.g., multiple instructions scheduled to access a same bank of a multiple bank data cache in a same clock cycle) from an instruction scheduler, a queue, or from both an instruction scheduler and a queue. In one embodiment, conflict resolution logic (e.g., 102 or 202) receives two instructions to (e.g., simultaneously) access a same bank of a multiple bank data cache in a same clock cycle from a scheduler, from a queue, or one from a scheduler and the other from a queue. In one embodiment, conflict resolution logic may receive an instruction age (e.g., relative age compared to another instruction being processed by the conflict resolution logic) and/or a total of banks (e.g., the identity of the banks or the total number of banks to be accessed) of the multiple bank data cache access to be accessed by the instruction (e.g., the access width).

Depicted entry 101 is a schematic example for a single (e.g., each) instruction to be sent (e.g., dispatched) to conflict resolution logic (e.g., 102 or 202). Depicted entry 101 includes a linear address 124 value, an access width 126 value (e.g., a value corresponding to the access width, for example, the number and/or identity of banks accessed), and a relative program order 128 value (e.g., age of the instruction, which may be a relative age of an instruction as compared to another instruction). A value may be indicated by a number of bits or bytes. Relative age may indicate that a first instruction is older (e.g., appearing earlier in the in-order program code) than a second instruction.

In one embodiment, for each (e.g., data cache accessing) instruction dispatched to the data cache 108, the upper, translated part 130 of the linear address 124 may be sent to a translation lookaside buffer (TLB) 136, for example, to (e.g., immediately) convert the virtual address to a physical address without looking up the physical address in a table (e.g., which may take multiple memory loads). TLB may also refer to a data translation lookaside buffer (DTLB). In one embodiment, for each (e.g., data cache accessing) instruction dispatched to the data cache 108, the lower, non-translated part (130, 132) of the linear address 124 may be a set 130 (e.g., associativity set or index field) value and an offset 134 (e.g., cache line offset) value which may be used to start data cache access early before the physical address is available. In a multiple bank (e.g., interleaved and set-associative) data cache, the non-translated part of the linear address may contain an index field (e.g., set 132) selecting the cache set and an offset field (e.g., offset 134) selecting the bank (e.g., 110B;111B;112B) where the first bit or byte of the assessed data is located. In one embodiment, the total of banks (e.g., the identity of the banks or the total number of banks) to be accessed by an instruction may be determined by combining the offset bits (e.g., 134) with the access width (e.g., 126) of the instruction. In one embodiment, the total of banks that an instruction is to access is proportional to its access width. In multiple bank data cache, the number of physical ports in each (e.g., cache) bank may be smaller than the number of cache access requests. In one embodiment, if two instructions are to access the same bank, only one of them may perform the access and the other one may be redispatched (e.g., to a queue, such as, but not limited to, a LSQ), for example, for future (e.g., at a later time) utilization by the conflict resolution logic. Conflict resolution logic may check whether the instructions (for example, instructions dispatched to access a multiple bank data cache in the same clock cycle, e.g., of a clock (timing) generator) are conflicting (e.g., scheduled to access at least one same bank of a data cache) for any of the banks. Conflict resolution logic may grant access priority (e.g., selecting which one of the dispatched instructions actually access the data cache) in case of a conflict. For example, based on the decision made by the conflict resolution logic, cache banks may be accessed using the index address field of the conflicting instruction that is granted access.

In one embodiment, e.g., in superscalar hardware processor cores, conflict resolution logic which, in the case of instructions scheduled or attempting to access a same bank of a multiple bank data cache, grants (e.g., gives) priority to the instruction with a higher access width and in case of an equal access width (e.g., to access the same total of banks), the instruction occurring earlier in the in-order program code (stream) is granted access priority.

Note that double arrows entering or exiting a component (e.g., a mux) may refer to two signals (e.g., data) being transmitted or received, e.g., simultaneously. For example, double arrows extending from set 130 (e.g., associativity set or index field) may refer to two instructions each transmitting or receiving their respective set.

Depicted conflict resolution logic includes a single arrow from and to certain components, but it should be understood that each arrow may include multiple (e.g., parallel) signals (e.g., data). For example, each instruction may have its own width 126 and/or RPO 128 to send (e.g., for instructions scheduled to access a data cache in the same clock cycle) to the conflict resolution logic. For example, conflict resolution logic may transmit a grant access signal 150 and/or redispatch signal 140 for each instruction that is checked for a conflict (e.g., checked for a conflict occurring during a same clock cycle) by the conflict resolution logic.

Identification of the bank(s) to be accessed and/or bank entry (e.g., index) in each bank may then be sent to cache tag 138, for example, from the TLB 136 and/or the set 132 and offset 134. Cache tag 138 (e.g., tag directory) may send an (e.g., request) signal to an address (e.g., a cache line) in a bank (or all of the banks) that a corresponding instruction is to access (e.g., a load and/or a store operation). Although the arrows are depicted as one way, two-way data transfer may occur. For example, arrows extending from cache tag 138 may allow retrieval of the information (e.g., data) stored in (e.g., a bank of) the data cache 108. Each bank (110B, 111B, 112B) may include a selection device, e.g., depicted multiplexers (muxes) (110A, 111A, 112A; accordingly) to allow access to that specific bank. Cache tag 138 and conflict resolution logic 102 (e.g., via grant access signal 150) may allow or deny access by a particular instruction to that particular bank. Conflict resolution logic 102 (e.g., via grant access signal 150) alone may allow or deny access by a particular instruction to that particular bank. Grant access signal may allow (e.g., independent) access to each individual bank (e.g., 0, 1, . . . N). Conflict resolution logic may redispatch a blocked (e.g., not granted access priority) instruction to be checked for a conflict against other instruction(s), e.g., instructions newly sent to the conflict resolution logic or other blocked instructions. Conflict resolution logic may decide that a blocked (e.g., not granted access priority) instruction is to be redispatched. For example, conflict resolution logic may send a redispatch signal 140 to the LSQ 106 informing the LSQ that the corresponding instruction is not completed yet and is to be selected by the LSQ dispatcher 120 again for another attempt to access the data cache 108. A redispatched instruction may be further rechecked for a conflict (e.g., as described above) against other instruction(s), for example, instructions newly sent to the conflict resolution logic and/or other blocked instructions. In one embodiment, conflict resolution logic may cause a blocked instruction to be redispatched back to the input of the conflict resolution logic to be re-checked for a conflict, e.g., as described above. Depicted redispatch signal 140 may cause the instruction associated with that redispatch signal 140 to be redispatched back into the LSQ 106 or pre-dispatched queue 122.

Conflict resolution logic may receive three or more instructions, for example, receiving data corresponding to each instruction, such as, but not limited to, identifying information (e.g., an address), an access width, and/or an age (e.g., RPO). In one embodiment, conflict resolution logic may grant access priority (e.g., allow access) to all three instructions if they are not conflicting, e.g., if they are not attempting (e.g., scheduled) to access any same banks during a same time period (e.g., clock cycle or cycles).

Conflict resolution logic may receive instructions, for example, receiving data corresponding to each instruction, such as, but not limited to, identifying information (e.g., an address), an access width, and/or an age (e.g., RPO), from a scheduler or other hardware. Conflict resolution logic may receive instructions and determine the data corresponding to each instruction, such as, but not limited to, identifying information (e.g., an address), an access width, and/or an age (e.g., RPO).

In one embodiment, a program (e.g., a program fragment) includes three instructions to access a data cache, and the first and third instructions have an equal access width and do not conflict with each other (e.g., they are not to access a same bank of a multiple bank data cache), while the second instruction has a larger access width than the first and third instructions and conflicts with both the first and the third instruction (e.g., the second instruction is to access a same bank as the first instruction and a same bank of the third instruction). In this embodiment, these instruction may be executed in a core of a hardware processor connected (e.g., on-chip) with a multiple (e.g., interleaved) bank data cache having two cache access ports and only one physical port per bank. In one case, each instruction may be dispatched in different clock cycles, that is, one instruction per clock cycle. In this case, no conflict occurs, so they both are granted access to the data cache by the conflict resolution logic (e.g., the conflict resolution logic does not make any redispatches). In another case, the first and third instructions are dispatched in the same clock cycle, and the second load is dispatched in another (e.g., earlier or later) clock cycle. In this case, no conflict occurs, and they both are granted access to the data cache by the conflict resolution logic (e.g., the conflict resolution logic does not make any redispatches). In yet another case, the first and second instructions are dispatched in the same clock cycle, and the conflict resolution logic detects the conflict. Instead of granting priority to the first load because of its earlier position in the program order, this embodiment of the conflict resolution logic would grant access priority to the second instruction and redispatch the first instruction as the access width of the second instruction is greater than the access width of the first instruction. In this example, if the first instruction is redispatched to be in the same clock cycle with the third instruction, there is no conflict between them, so they both are granted access to the data cache by the conflict resolution logic (e.g., the conflict resolution logic does not make any redispatches). In this example, only two dispatch (e.g., clock) cycles are needed to execute the given instruction sequence. In certain aspects, this disclosure may improve memory access throughput and/or give higher performance.

Figure 2:
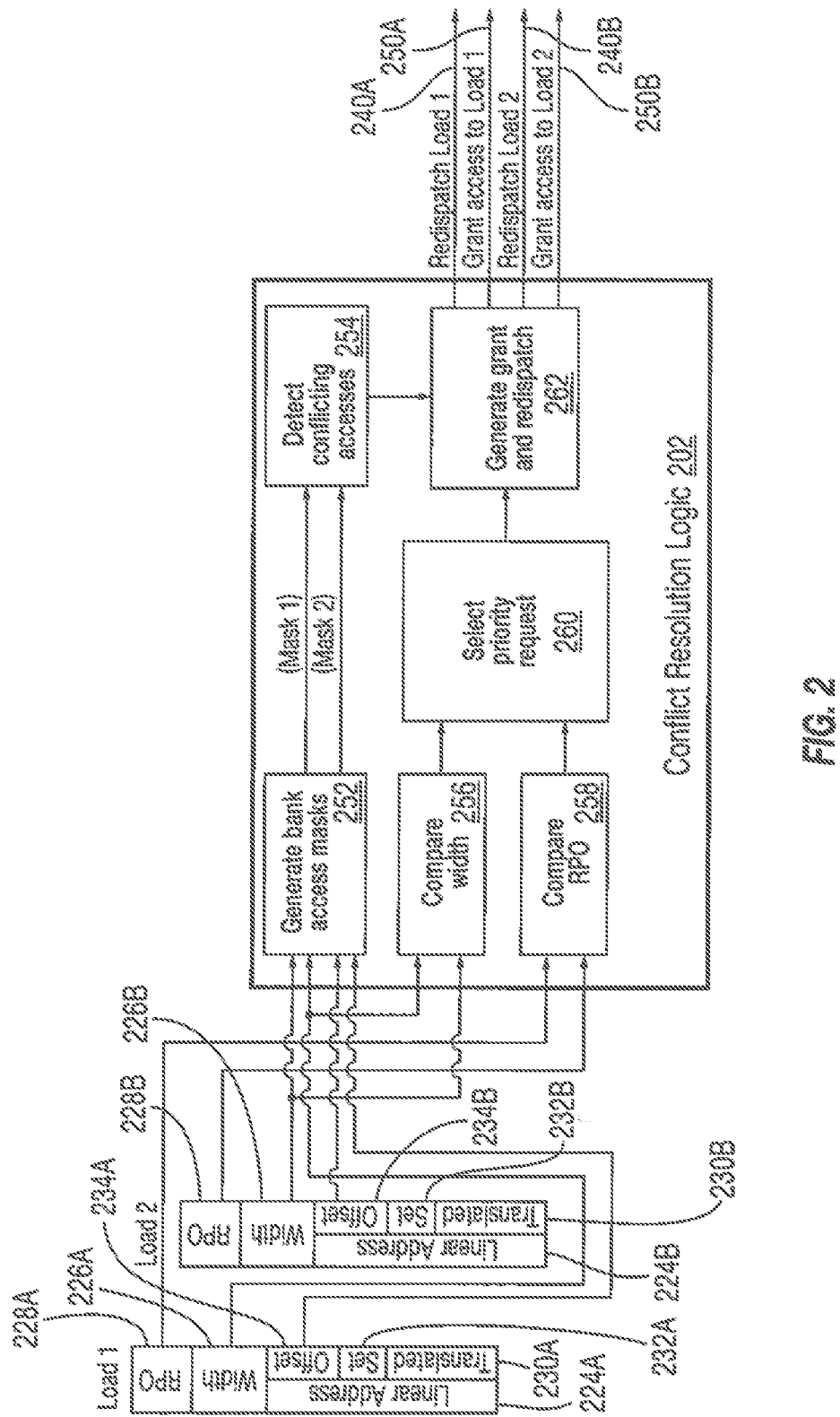
FIG. 2 illustrates an embodiment of conflict resolution logic.

FIG. 2 illustrates an embodiment of conflict resolution logic 202. In one embodiment, conflict resolution logic 202 may be utilized as conflict resolution logic 102 in FIG. 1. Depicted conflict resolution logic 202 includes five modules: generate bank access masks module 252, detect conflicting accesses module 254, compare width module 256, compare relative program order (RPO) module 258, select priority request module 260, and generate grant and redispatch module 262. Although these modules are shown as separate, they may be combined in any combination. Conflict resolution logic 202 is depicted as receiving information for two instructions (e.g., Load 1 and Load 2), however any plurality of instructions may be arbitrated by conflict resolution logic. Modules may be operated concurrently in time or in series in time.

Depicted entries are schematic examples for each instruction to be sent (e.g., dispatched) to conflict resolution logic 202. Depicted entries for each instruction (depicted as Load 1 and Load 2) into conflict resolution logic 202 include a linear address (224A,224B) value, an access width (226A, 226B) value (e.g., a value corresponding to the access width, for example, the number and/or identity of banks accessed), and a relative program order (228A,228B) value (e.g., age of the instruction, which may be a relative age of an instruction as compared to another instruction). Depicted RPO values may indicate which of the instructions being arbitrated by the conflict resolution logic 202 are older (e.g., earlier in the in-order program). A value may be indicated by a number of bits or bytes. Relative age may indicate that a first instruction is older (e.g., appearing earlier in the in-order program code) than a second instruction, e.g., by setting or clearing a bit to indicate that an instruction is older as compared to another instruction.

Each (e.g., data cache accessing) instruction (e.g., Load 1 and Load 2) dispatched to the data cache (e.g., 108), the upper, translated part (230A,230B) of the linear address (224A,224B) may be sent to the conflict resolution logic 202. In one embodiment, for each (e.g., data cache accessing) instruction dispatched to the data cache, the lower, non-translated part (230A,230B;232A,232B) of a linear address (224A,224B) may be a set (230A,230B) (e.g., associativity set or index field) value and an offset (234A, 234B) (e.g., cache line offset) value which may be used to start data cache access early before the physical address is available. In a multiple bank (e.g., interleaved and set-associative) data cache, the non-translated part of the linear address may contain an index field (e.g., sets 232A and 232B) selecting the cache set and an offset field (e.g., offsets 234A and 234B) selecting the bank (e.g., 110B;111B;112B in FIG. 1) where the first bit or byte of the assessed data is located. In one embodiment, the total of banks (e.g., the identity of the banks or the total number of banks) to be accessed by an instruction may be determined by combining the offset bits (e.g., 234A,234B) with the access width (e.g., 226A,226B) of the instruction.

In FIG. 2, generate bank access masks module 252 receives an input of information of an instruction which corresponds to the bank or banks of a multiple bank data cache that are to be accessed by that instruction. As depicted, bank access masks module 252 receives the offset field (e.g., offsets 234A and 234B) and the access width (e.g., widths 226A, 226B) for each instruction and generates a bank(s) access mask for each instruction corresponding to which particular bank or banks are to be accessed by an instruction.

Table 1 below illustrates an embodiment where the data cache consists of 16 banks and stores 64-byte cache lines. In this embodiment, each cache line consists of 16 pieces, 4 bytes each in width, located in different banks. In this embodiment, address bits [5:2] may contain the number of the cache bank where the accessed byte with the lowest address is located. The offset of the accessed byte with the highest address may be calculated as the saturated sum of the original offset and the access width. If a carry out of this sum to bit 6 appears, the offset of the byte with the highest address may be considered equal to 0x3F. Bits [5:2] of this sum may contain the number of the cache bank where the accessed byte with the highest address is located. In this embodiment, the mask contains 16 bits, so that each bit corresponds to one of 16 banks. Bits corresponding to the banks where the bytes with the lowest and the highest address are located, may be set to 1, as well as all mask bits between them. Other mask bits may be set to 0. Examples of masks generated based on various offsets and access widths are presented in Table 1.

TABLE 1

| Offset of the byte with the lowest address (in hexadecimal form) | Access width (in decimal form) | Offset of the byte with the highest address (in hexadecimal form) | Mask (in binary form) | Banks that need to be accessed | Total number of banks accessed |
| --- | --- | --- | --- | --- | --- |
| 0x02 | 4 | 0x06 | 1100000000000000 | 0, 1 | 2 |
| 0x11 | 8 | 0x19 | 0011100000000000 | 2, 3, 4 | 3 |
| 0x39 | 1 | 0x3a | 0000000000000010 | 14 | 1 |
| 0x35 | 16 | 0x3f | 0000000000001111 | 12, 13, 14, 15 | 4 |

Corresponding bank access masks (e.g., Mask 1 and Mask 2) may be transmitted to detect conflicting accesses module 254. For example, detect conflicting accesses module 254 may overlap the masks (depicted as two masks, but any plurality may be compared) to detect whether the instructions are conflicting (e.g., are to access a same bank of a multiple bank data cache). Detect conflicting accesses module 254 may include a comparator. A bank access mask may include a bit set high for each bank of a multiple bank data cache to be accessed in a same clock cycle. Detect conflicting accesses module 254 may compare such masks and indicate (e.g., by outputting a conflict signal to generate grant and redispatch module 262, e.g., such a signal may be a conflict bit being set high as a flag) a conflict where a bit position in the first mask is set high and the same bit position in the second mask is set high, where the bit positions may correspond to a same bank of the multiple bank data cache.

Depicted compare width module 256 may receive the access width (e.g., widths 226A,226B) of the instructions being arbitrated (e.g., instructions to access a multiple bank data cache in the same clock cycle) and compare the (e.g., two as depicted) values to determine which is larger. Depicted compare width module 256 may output the result of the comparison to select priority request module 260. In the depicted circuit of FIG. 2, compare relative program order (RPO) module 258 may receive the ages (e.g., RPOs 228A,228B) of the instructions being arbitrated and compare the (e.g., two as depicted) values to determine which is larger. Depicted compare RPO module 258 may output the result of the comparison to select priority request module 260. Two or all of the generate bank access masks module 252, detect conflicting accesses module 254, and compare width module 256 may operate in parallel (time). Compare width module 256 may include a comparator. Compare RFO module may include a comparator.

Select priority request module 260 may receive the results of the access width and age (e.g., RPO) comparisons. Select priority request module 260 may output to the generate grant and redispatch module 262 a priority (e.g., width) indication (e.g., "Load1_Accesses_Most_Banks") for an instruction (e.g., Load 1) with a higher access width than the other arbitrated instructions (e.g., Load 2), and in case of equal access widths (e.g., to access the same total of banks), the select priority request module 260 may output to the generate grant and redispatch module 262 an age indication (e.g., "Equal_But_Load 1_Is_Oldest") for an instruction occurring earliest in the in-order program code (stream) relative to the other arbitrated instructions (e.g., Load 2).

Generate grant and redispatch module 262 may receive a conflict signal (e.g., where a high bit indicates a conflict such that the arbitrated instructions are to access a same bank of a multiple bank data cache). Generate grant and redispatch module 262 may receive a priority (e.g., width) indication from select priority request module 260 for an instruction (e.g., Load 1) with a higher access width than the other arbitrated instructions (e.g., Load 2), and in case of equal access widths (e.g., to access the same total of banks), an age indication for an instruction occurring earliest in the in-order program code (stream) relative to the other arbitrated instructions (e.g., Load 2). In one embodiment, when generate grant and redispatch module 262 receives a no conflict signal (e.g., where a low bit indicates no conflict such that the arbitrated instructions are to not access a same bank of a multiple bank data cache), all of the arbitrated instructions may be granted access to the multiple bank data cache.

In one embodiment, when generate grant and redispatch module 262 receives a conflict signal (e.g., where a high bit indicates a conflict such that the arbitrated instructions are to access a same bank of a multiple bank data cache), grant and redispatch module 262 may then look to the output from the select priority request module 260. Generate grant and redispatch module 262 may then utilize a priority (e.g., width) indication from select priority request module 260 for an instruction (e.g., Load 1) with a higher access width than the other arbitrated instructions (e.g., Load 2) to grant access to the instruction (e.g., Load 1) and to cause the redispatch of the other instruction(s) (e.g., Load 2). If the access widths are equal (e.g., to access the same total of banks), an age indication for an oldest instruction (e.g., occurring earliest in the in-order program code (stream)) relative to the other arbitrated instructions (e.g., Load 2) to grant access to the oldest instruction (e.g., Load 1) and to cause the redispatch of the other instruction(s) (e.g., Load 2). Redispatch Load 1 (240A), redispatch Load 2 (240B), grant access to Load 1 (250A), and grant access to Load 2 (250B) may be signals to cause the redispatches and grants, respectively, or may directly cause such redispatches and grants, respectively.

Figure 3:
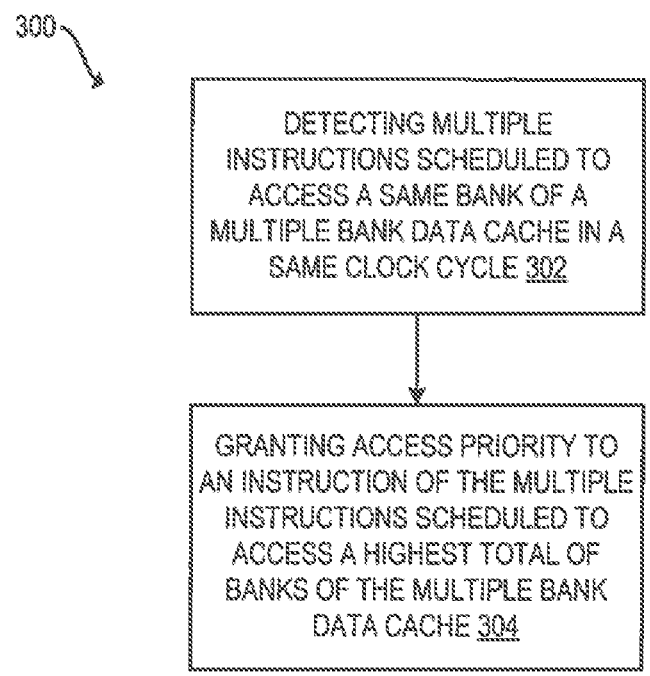
FIG. 3 illustrates an embodiment of a flow diagram to control access to a multiple bank data cache.

FIG. 3 illustrates an embodiment of a flow diagram 300 to control access to a multiple bank data cache. In one embodiment, conflict resolution logic may include logic according to the flow diagram. Depicted flow diagram 300 includes detecting multiple instructions scheduled to access a same bank of a multiple bank data cache in a same clock cycle 302, and granting access priority to an instruction of the multiple instructions scheduled to access a highest total of banks of the multiple bank data cache 304.

Figure 4:
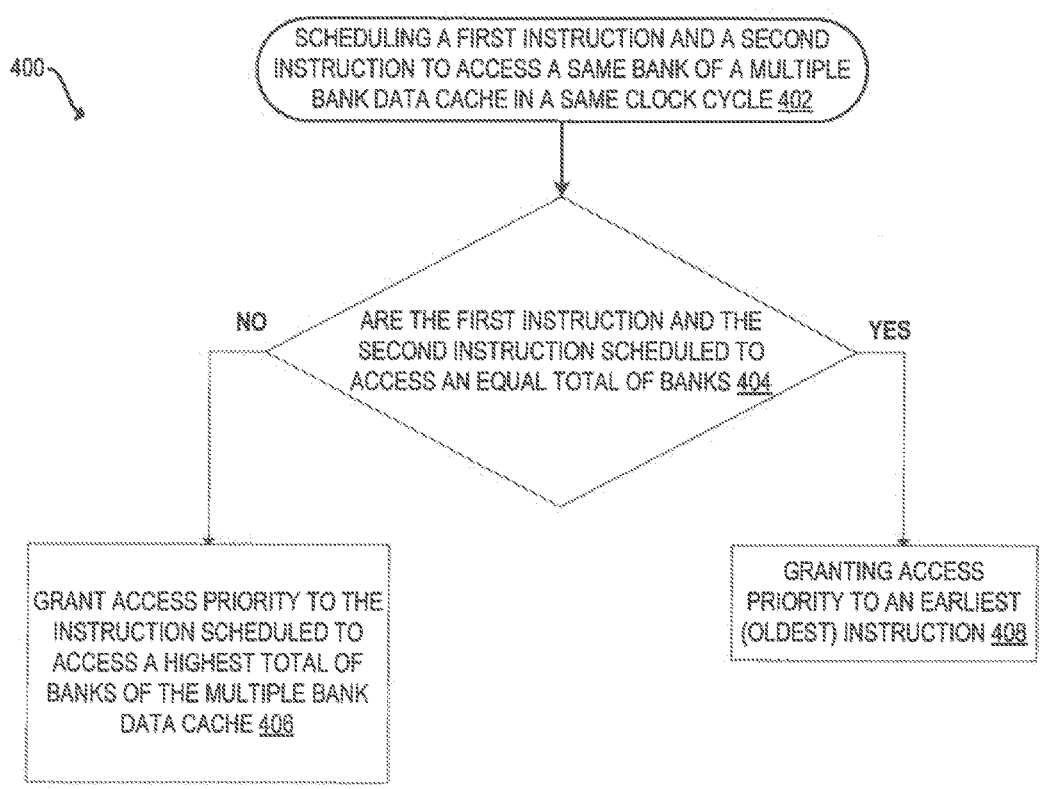
FIG. 4 illustrates an embodiment of a flow diagram to control access to a multiple bank data cache.

FIG. 4 illustrates an embodiment of a flow diagram to control access to a multiple bank data cache. In one embodiment, conflict resolution logic may include logic according to the flow diagram. Depicted flow diagram 400 includes scheduling a first instruction and a second instruction to access a same bank of a multiple bank data cache in a same clock cycle 402 and then determining if the first instruction and the second instruction are scheduled to access an equal total of banks 404. In the depicted flow diagram 400, if the first instruction and the second instruction are scheduled to access an equal total of banks ("YES"), then access priority is granted to an earliest (oldest) instruction 408. In the depicted flow diagram 400, if the first instruction and the second instruction are not scheduled to access an equal total of banks ("NO"), then access priority is granted to the instruction scheduled to access a highest total of banks of the multiple bank data cache 406.

In one embodiment, a hardware apparatus includes conflict resolution logic to detect multiple instructions scheduled to access a same bank of a multiple bank data cache in a same clock cycle and to grant access priority to an instruction of the multiple instructions scheduled to access a highest total of banks of the multiple bank data cache. Conflict logic may grant the access priority to the instruction with a largest access width. A queue entry for each of the multiple instructions may include an access width. Conflict resolution logic may grant access priority to an earliest instruction when the multiple instructions are scheduled to access a same total of banks of the multiple bank data cache. A queue entry for each of the multiple instructions may include an age, e.g., a relative program order. An instruction of the multiple instructions that is not to be granted access priority may be redispatched to the data cache (e.g., the data cache access pipeline), and may encounter another conflict detected by the conflict resolution logic. An instruction of the multiple instructions that is not to be granted access priority may be caused to be redispatched to the conflict resolution logic, e.g., for future arbitration of the instruction. Conflict resolution logic may detect the multiple instructions scheduled to access the same bank of the multiple bank data cache in the same clock cycle by comparing a bank access mask of each of a plurality of instructions. Conflict resolution logic may grant access to the multiple bank data cache to multiple instructions that are not scheduled to access the same bank of the multiple bank data cache in the same clock cycle.

In another embodiment, a method to control access to a multiple bank data cache may include detecting multiple instructions scheduled to access a same bank of the multiple bank data cache in a same clock cycle, and granting access priority to an instruction of the multiple instructions scheduled to access a highest total of banks of the multiple bank data cache. The granting may include granting the access priority to the instruction with a largest access width. The method may include providing a queue entry for each of the multiple instructions that includes an access width. The granting may include granting access priority to an earliest instruction when the multiple instructions are scheduled to access a same total of banks of the multiple bank data cache. The method may include providing a queue entry for each of the multiple instructions that include an age, e.g., a relative program order. The method may include redispatching an instruction of the multiple instructions that is not to be granted access priority. The detecting may include comparing a bank access mask of each of a plurality of instructions. The method may include granting access to the multiple bank data cache to multiple instructions that are not scheduled to access the same bank of the multiple bank data cache in the same clock cycle.

In yet another embodiment, a hardware system includes a core or a plurality of cores to execute a plurality of instructions in a same clock cycle, and conflict resolution logic to detect multiple instructions scheduled to access a same bank of a multiple bank data cache in the same clock cycle and to grant access priority to an instruction of the multiple instructions scheduled to access a highest total of banks of the multiple bank data cache. Conflict resolution logic may grant the access priority to the instruction with a largest access width. A queue entry for each of the multiple instructions include an access width. Conflict resolution logic may grant access priority to an earliest instruction when the multiple instructions are scheduled to access a same total of banks of the multiple bank data cache. A queue entry for each of the multiple instructions include a relative program order. An instruction of the multiple instructions that is not to be granted access priority may be redispatched to the conflict resolution logic. Conflict resolution logic may detect the multiple instructions scheduled to access the same bank of the multiple bank data cache in the same clock cycle by comparing a bank access mask of each of the plurality of instructions. Conflict resolution logic may grant access to the multiple bank data cache to multiple instructions that are not scheduled to access the same bank of the multiple bank data cache in the same clock cycle.

In yet another embodiment, a hardware apparatus may include means to detect multiple instructions scheduled to access a same bank of a multiple bank data cache in a same clock cycle and to grant access priority to an instruction of the multiple instructions scheduled to access a highest total of banks of the multiple bank data cache.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 5A is a block diagram illustrating both an exemplary in-order pipeline and an exemplary register renaming, out-of-order issue/execution pipeline according to embodiments of the disclosure. FIG. 5B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 5A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524.

FIG. 5B shows processor core 590 including a front end unit 530 coupled to an execution engine unit 550, and both are coupled to a memory unit 570. The core 590 may be a reduced instruction set computing (RISC) core, a complex instruction set computing (CISC) core, a very long instruction word (VLIW) core, or a hybrid or alternative core type. As yet another option, the core 590 may be a special-purpose core, such as, for example, a network or communication core, compression engine, coprocessor core, general purpose computing graphics processing unit (GPGPU) core, graphics core, or the like.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 590 includes a microcode ROM or other medium that stores microcode for certain macroinstructions (e.g., in decode unit 540 or otherwise within the front end unit 530). The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations, central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 558 comprises a vector registers unit, a write mask registers unit, and a scalar registers unit. These register units may provide architectural vector registers, vector mask registers, and general purpose registers. The physical register file(s) unit(s) 558 is overlapped by the retirement unit 554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which includes a data TLB unit 572 coupled to a data cache unit 574 coupled to a level 2 (L2) cache unit 576. In one exemplary embodiment, the memory access units 564 may include a load unit, a store address unit, and a store data unit, each of which is coupled to the data TLB unit 572 in the memory unit 570. The instruction cache unit 534 is further coupled to a level 2 (L2) cache unit 576 in the memory unit 570. The L2 cache unit 576 is coupled to one or more other levels of cache and eventually to a main memory.

By way of example, the exemplary register renaming, out-of-order issue/execution core architecture may implement the pipeline 500 as follows: 1) the instruction fetch 538 performs the fetch and length decoding stages 502 and 504; 2) the decode unit 540 performs the decode stage 506; 3) the rename/allocator unit 552 performs the allocation stage 508 and renaming stage 510; 4) the scheduler unit(s) 556 performs the schedule stage 512; 5) the physical register file(s) unit(s) 558 and the memory unit 570 perform the register read/memory read stage 514; the execution cluster 560 perform the execute stage 516; 6) the memory unit 570 and the physical register file(s) unit(s) 558 perform the write back/memory write stage 518; 7) various units may be involved in the exception handling stage 522; and 8) the retirement unit 554 and the physical register file(s) unit(s) 558 perform the commit stage 524.

The core 590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-threading technology).

While register renaming is described in the context of out-of-order execution, it should be understood that register renaming may be used in an in-order architecture. While the illustrated embodiment of the processor also includes separate instruction and data cache units 534/574 and a shared L2 cache unit 576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 6B:
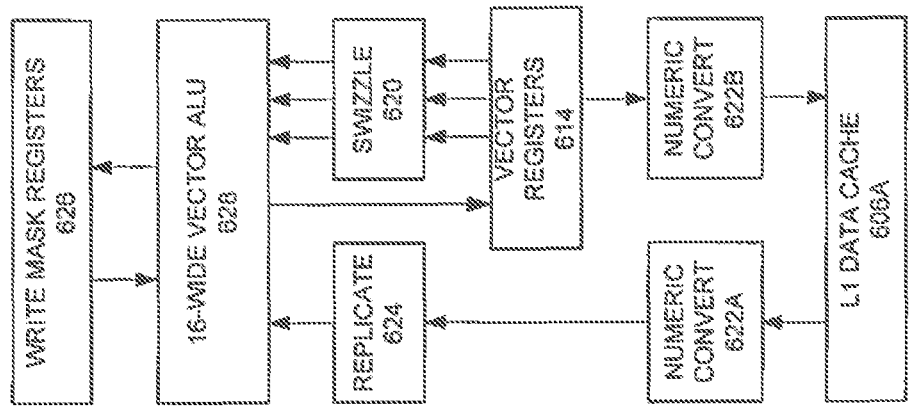
FIG. 6B is an expanded view of part of the processor core in FIG. 6A according to embodiments of the disclosure.
Figure 6A:
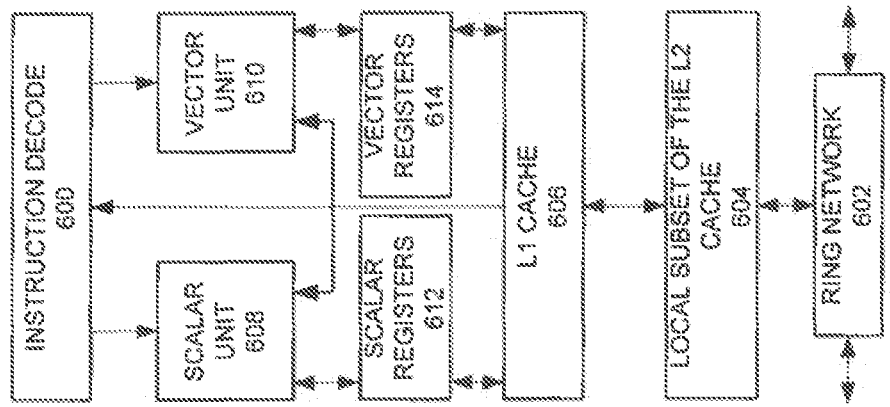
FIG. 6A is a block diagram of a single processor core, along with its connection to the on-die interconnect network and with its local subset of the Level 2 (L2) cache, according to embodiments of the disclosure.

FIGS. 6A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 6A is a block diagram of a single processor core, along with its connection to the on-die interconnect network 602 and with its local subset of the Level 2 (L2) cache 604, according to embodiments of the disclosure. In one embodiment, an instruction decoder 600 supports the x86 instruction set with a packed data instruction set extension. An L1 cache 606 allows low-latency accesses to cache memory into the scalar and vector units. While in one embodiment (to simplify the design), a scalar unit 608 and a vector unit 610 use separate register sets (respectively, scalar registers 612 and vector registers 614) and data transferred between them is written to memory and then read back in from a level 1 (L1) cache 606, alternative embodiments of the disclosure may use a different approach (e.g., use a single register set or include a communication path that allow data to be transferred between the two register files without being written and read back).

The local subset of the L2 cache 604 is part of a global L2 cache that is divided into separate local subsets, one per processor core. Each processor core has a direct access path to its own local subset of the L2 cache 604. Data read by a processor core is stored in its L2 cache subset 604 and can be accessed quickly, in parallel with other processor cores accessing their own local L2 cache subsets. Data written by a processor core is stored in its own L2 cache subset 604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 6B is an expanded view of part of the processor core in FIG. 6A according to embodiments of the disclosure. FIG. 6B includes an L1 data cache 606A part of the L1 cache 604, as well as more detail regarding the vector unit 610 and the vector registers 614. Specifically, the vector unit 610 is a 16-wide vector processing unit (VPU) (see the 16-wide ALU 628), which executes one or more of integer, single-precision float, and double-precision float instructions. The VPU supports swizzling the register inputs with swizzle unit 620, numeric conversion with numeric convert units 622A-B, and replication with replication unit 624 on the memory input. Write mask registers 626 allow predicating resulting vector writes.

Processor with Integrated Memory Controller and Graphics

FIG. 7 is a block diagram of a processor 700 that may have more than one core, may have an integrated memory controller, and may have integrated graphics according to embodiments of the disclosure. The solid lined boxes in FIG. 7 illustrate a processor 700 with a single core 702A, a system agent 710, a set of one or more bus controller units 716, while the optional addition of the dashed lined boxes illustrates an alternative processor 700 with multiple cores 702A-N, a set of one or more integrated memory controller unit(s) 714 in the system agent unit 710, and special purpose logic 708.

Thus, different implementations of the processor 700 may include: 1) a CPU with the special purpose logic 708 being integrated graphics and/or scientific (throughput) logic (which may include one or more cores), and the cores 702A-N being one or more general purpose cores (e.g., general purpose in-order cores, general purpose out-of-order cores, a combination of the two); 2) a coprocessor with the cores 702A-N being a large number of special purpose cores intended primarily for graphics and/or scientific (throughput); and 3) a coprocessor with the cores 702A-N being a large number of general purpose in-order cores. Thus, the processor 700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4A), or other levels of cache, a last level cache (LLC), and/or combinations thereof. While in one embodiment a ring based interconnect unit 712 interconnects the integrated graphics logic 708, the set of shared cache units 706, and the system agent unit 710/integrated memory controller unit(s) 714, alternative embodiments may use any number of well-known techniques for interconnecting such units. In one embodiment, coherency is maintained between one or more cache units 706 and cores 702-A-N.

In some embodiments, one or more of the cores 702A-N are capable of multi-threading. The system agent 710 includes those components coordinating and operating cores 702A-N. The system agent unit 710 may include for example a power control unit (PCU) and a display unit. The PCU may be or include logic and components needed for regulating the power state of the cores 702A-N and the integrated graphics logic 708. The display unit is for driving one or more externally connected displays.

The cores 702A-N may be homogenous or heterogeneous in terms of architecture instruction set; that is, two or more of the cores 702A-N may be capable of execution the same instruction set, while others may be capable of executing only a subset of that instruction set or a different instruction set.

Exemplary Computer Architectures

FIGS. 8-11 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 8:
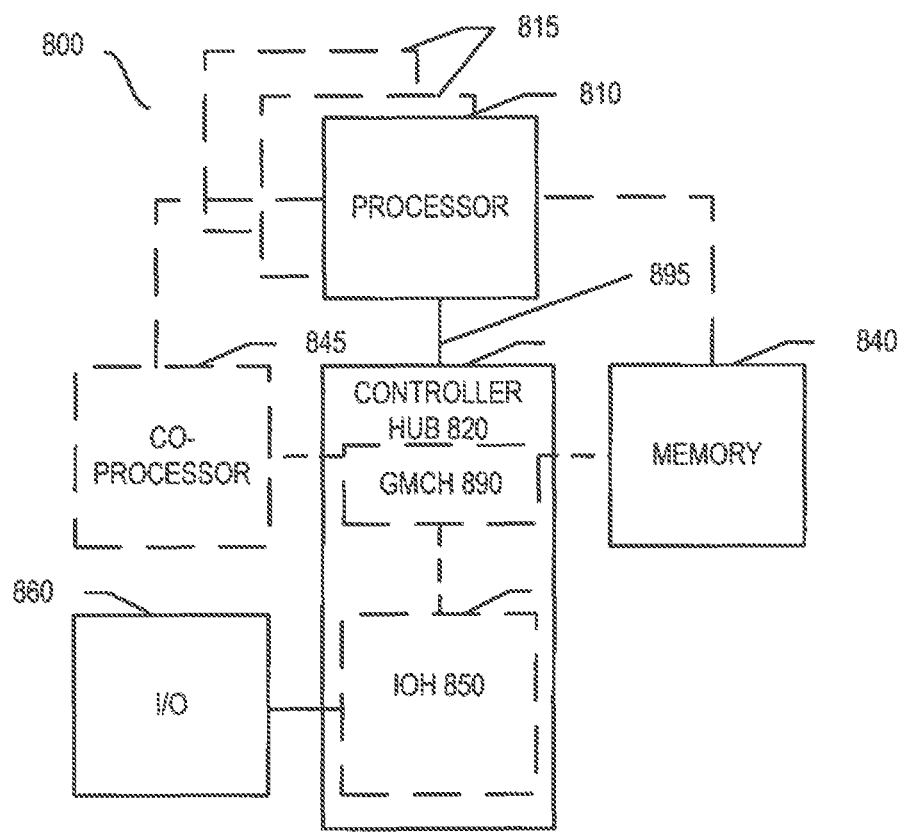
FIG. 8 is a block diagram of a system in accordance with one embodiment of the present disclosure.

Referring now to FIG. 8, shown is a block diagram of a system 800 in accordance with one embodiment of the present disclosure. The system 800 may include one or more processors 810, 815, which are coupled to a controller hub 820. In one embodiment the controller hub 820 includes a graphics memory controller hub (GMCH) 890 and an Input/Output Hub (IOH) 850 (which may be on separate chips); the GMCH 890 includes memory and graphics controllers to which are coupled memory 840 and a coprocessor 845; the IOH 850 is couples input/output (I/O) devices 860 to the GMCH 890. Alternatively, one or both of the memory and graphics controllers are integrated within the processor (as described herein), the memory 840 and the coprocessor 845 are coupled directly to the processor 810, and the controller hub 820 in a single chip with the IOH 850.

The optional nature of additional processors 815 is denoted in FIG. 8 with broken lines. Each processor 810, 815 may include one or more of the processing cores described herein and may be some version of the processor 700.

The memory 840 may be, for example, dynamic random access memory (DRAM), phase change memory (PCM), or a combination of the two. For at least one embodiment, the controller hub 820 communicates with the processor(s) 810, 815 via a multi-drop bus, such as a frontside bus (FSB), point-to-point interface such as QuickPath Interconnect (QPI), or similar connection 895.

In one embodiment, the coprocessor 845 is a special-purpose processor, such as, for example, a high-throughput MIC processor, a network or communication processor, compression engine, graphics processor, GPGPU, embedded processor, or the like. In one embodiment, controller hub 820 may include an integrated graphics accelerator.

There can be a variety of differences between the physical resources 810, 815 in terms of a spectrum of metrics of merit including architectural, microarchitectural, thermal, power consumption characteristics, and the like.

In one embodiment, the processor 810 executes instructions that control data processing operations of a general type. Embedded within the instructions may be coprocessor instructions. The processor 810 recognizes these coprocessor instructions as being of a type that should be executed by the attached coprocessor 845. Accordingly, the processor 810 issues these coprocessor instructions (or control signals representing coprocessor instructions) on a coprocessor bus or other interconnect, to coprocessor 845. Coprocessor(s) 845 accept and execute the received coprocessor instructions.

Figure 9:
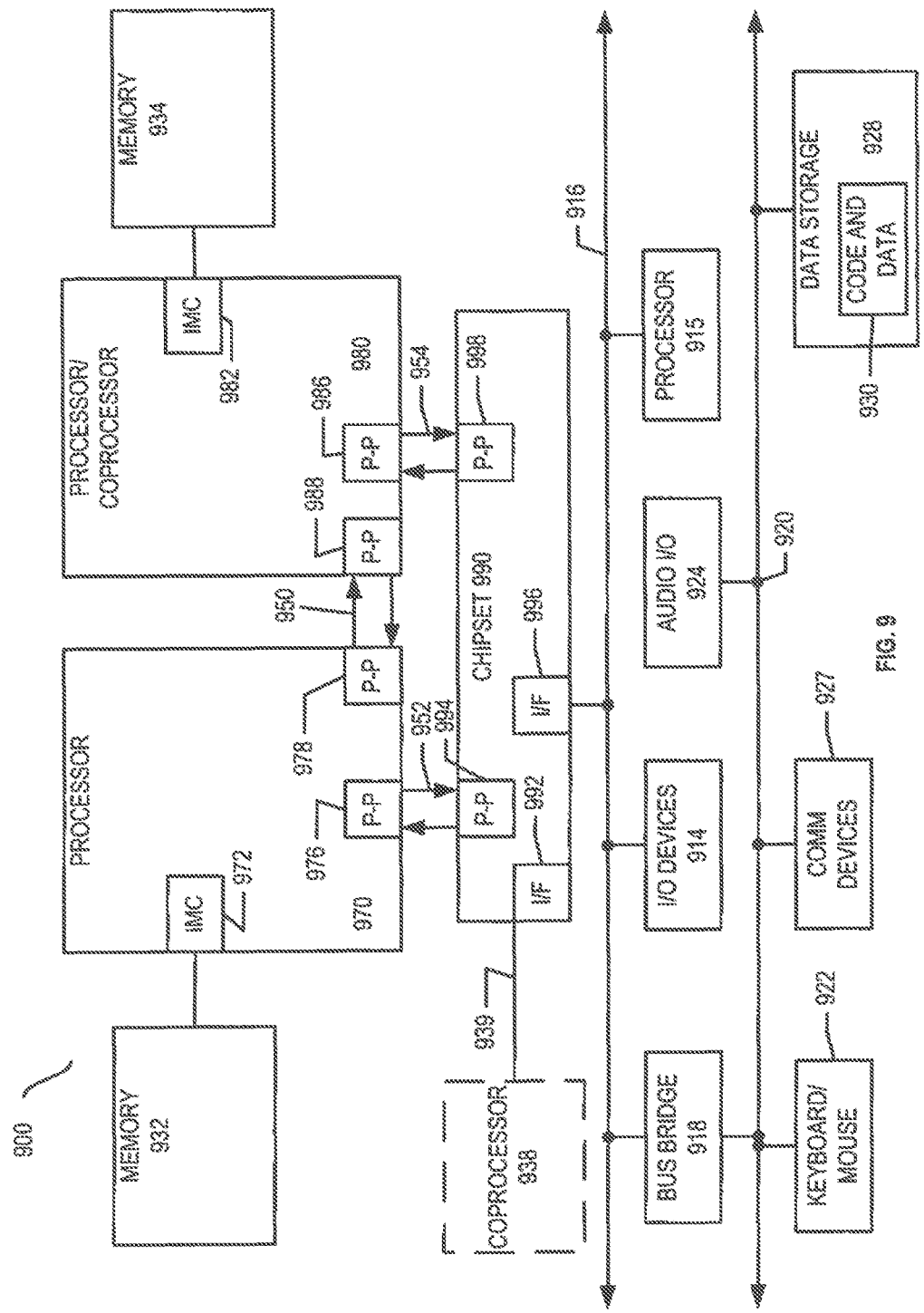
FIG. 9 is a block diagram of a more specific exemplary system in accordance with an embodiment of the present disclosure.

Referring now to FIG. 9, shown is a block diagram of a first more specific exemplary system 900 in accordance with an embodiment of the present disclosure. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 700. In one embodiment of the disclosure, processors 970 and 980 are respectively processors 810 and 815, while coprocessor 938 is coprocessor 845. In another embodiment, processors 970 and 980 are respectively processor 810 coprocessor 845.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present disclosure is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916.

In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

Figure 10:
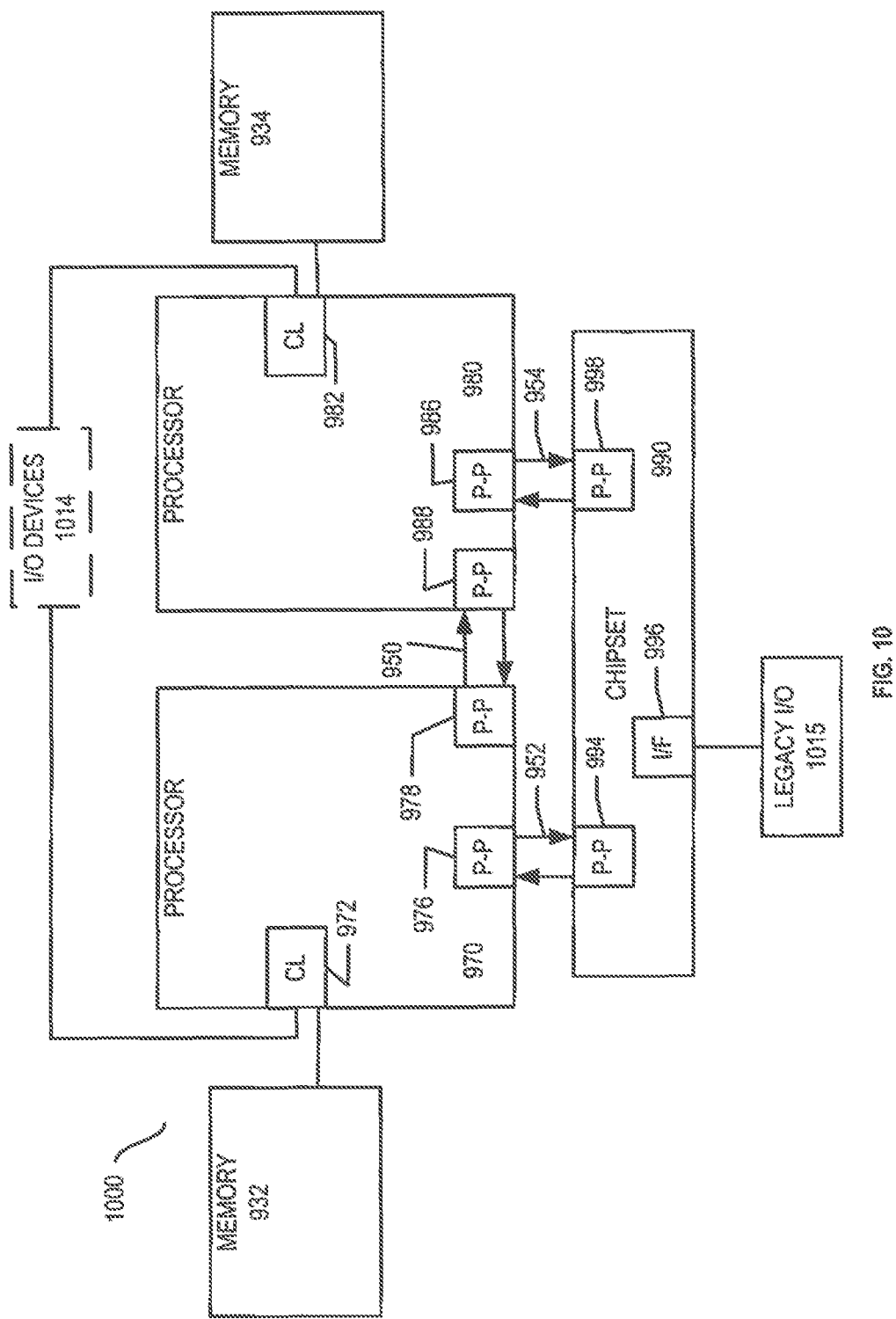
FIG. 10, shown is a block diagram of a second more specific exemplary system in accordance with an embodiment of the present disclosure.

Referring now to FIG. 10, shown is a block diagram of a second more specific exemplary system 1000 in accordance with an embodiment of the present disclosure. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processors 970, 980 may include integrated memory and I/O control logic ("CL") 972 and 982, respectively. Thus, the CL 972, 982 include integrated memory controller units and include I/O control logic. FIG. 10 illustrates that not only are the memories 932, 934 coupled to the CL 972, 982, but also that I/O devices 1014 are also coupled to the control logic 972, 982. Legacy I/O devices 1015 are coupled to the chipset 990.

Figure 11:
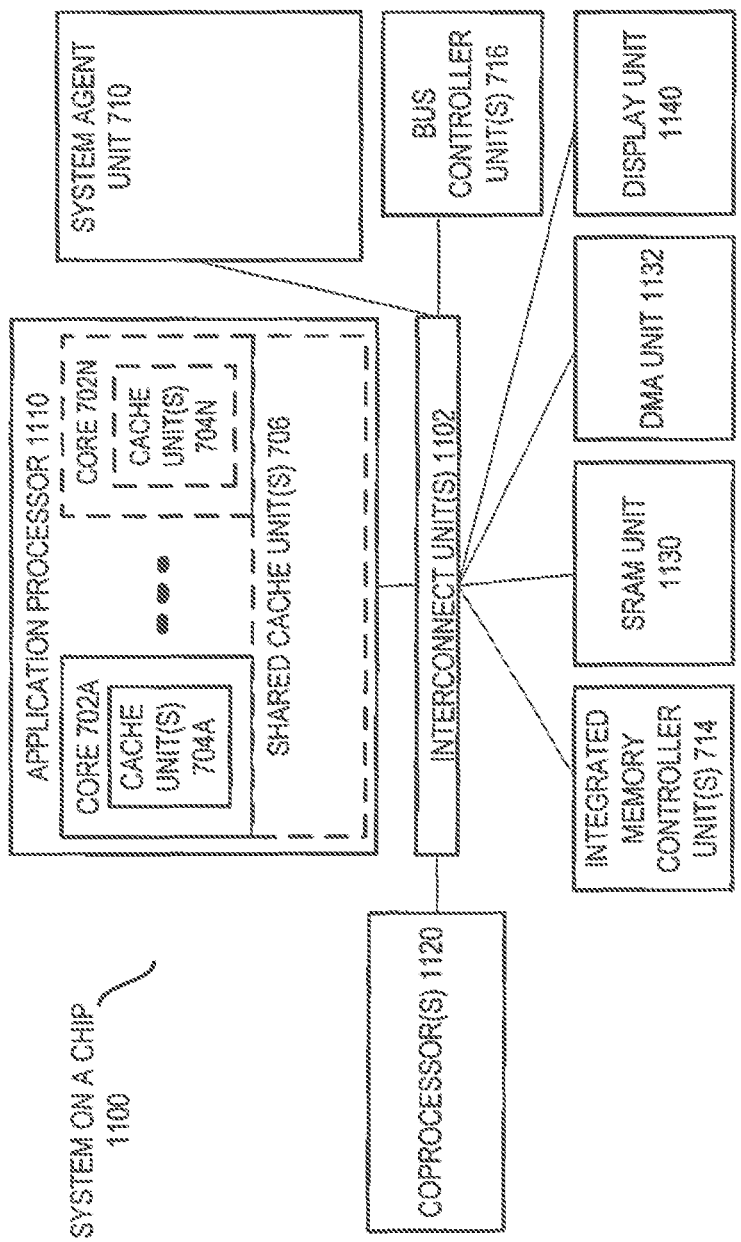
FIG. 11, shown is a block diagram of a system on a chip (SoC) in accordance with an embodiment of the present disclosure.

Referring now to FIG. 11, shown is a block diagram of a SoC 1100 in accordance with an embodiment of the present disclosure. Similar elements in FIG. 7 bear like reference numerals. Also, dashed lined boxes are optional features on more advanced SoCs. In FIG. 11, an interconnect unit(s) 1102 is coupled to: an application processor 1110 which includes a set of one or more cores 202A-N and shared cache unit(s) 706; a system agent unit 710; a bus controller unit(s) 716; an integrated memory controller unit(s) 714; a set or one or more coprocessors 1120 which may include integrated graphics logic, an image processor, an audio processor, and a video processor; an static random access memory (SRAM) unit 1130; a direct memory access (DMA) unit 1132; and a display unit 1140 for coupling to one or more external displays. In one embodiment, the coprocessor(s) 1120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 12 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 12 shows a program in a high level language 1202 may be compiled using an x86 compiler 1204 to generate x86 binary code 1206 that may be natively executed by a processor with at least one x86 instruction set core 1216. The processor with at least one x86 instruction set core 1216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1204 represents a compiler that is operable to generate x86 binary code 1206 (e.g., object code) that can, with or without additional linkage processing, be executed on the processor with at least one x86 instruction set core 1216. Similarly, FIG. 12 shows the program in the high level language 1202 may be compiled using an alternative instruction set compiler 1208 to generate alternative instruction set binary code 1210 that may be natively executed by a processor without at least one x86 instruction set core 1214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1212 is used to convert the x86 binary code 1206 into code that may be natively executed by the processor without an x86 instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation or any other process, allows a processor or other electronic device that does not have an x86 instruction set processor or core to execute the x86 binary code 1206.

What is claimed is:

1. A hardware apparatus comprising:
a conflict resolution circuit to detect multiple instructions scheduled to access a same bank of a multiple bank data cache in a same time period and to grant access priority to an instruction of the multiple instructions with a largest access width of the multiple bank data cache.

2. The hardware apparatus of claim 1, wherein the conflict resolution circuit is to grant the access priority to the instruction scheduled to access a highest total of banks of the multiple bank data cache.

3. The hardware apparatus of claim 1, wherein a queue entry for each of the multiple instructions include an access width value.

4. The hardware apparatus of claim 1, wherein the conflict resolution circuit is to grant access priority to an earliest instruction when the multiple instructions are scheduled to access a same access width of the multiple bank data cache.

5. The hardware apparatus of claim 4, wherein a queue entry for each of the multiple instructions include a relative program order.

6. The hardware apparatus of claim 1, wherein an instruction of the multiple instructions that is not to be granted access priority is to be redispatched to the conflict resolution circuit.

7. The hardware apparatus of claim 1, wherein the conflict resolution circuit is to detect the multiple instructions scheduled to access the same bank of the multiple bank data cache in the same time period by comparing a bank access mask of each of a plurality of instructions.

8. The hardware apparatus of claim 1, wherein the conflict resolution circuit is to grant access to the multiple bank data cache to multiple instructions that are not scheduled to access the same bank of the multiple bank data cache in the same time period.

9. A method to control access to a multiple bank data cache comprising:

detecting multiple instructions scheduled to access a same bank of the multiple bank data cache in a same time period; and
granting access priority to an instruction of the multiple instructions with a largest access width of the multiple bank data cache.

10. The method of claim 9, wherein the granting comprises granting the access priority to the instruction scheduled to access a highest total of banks of the multiple bank data cache.

11. The method of claim 9, further comprising providing a queue entry for each of the multiple instructions that includes an access width value.

12. The method of claim 9, wherein the granting comprises granting access priority to an earliest instruction when the multiple instructions are scheduled to access a same access width of the multiple bank data cache.

13. The method of claim 12, further comprising providing a queue entry for each of the multiple instructions that include a relative program order.

14. The method of claim 9, further comprising redispatching an instruction of the multiple instructions that is not to be granted access priority.

15. The method of claim 9, wherein the detecting comprises comparing a bank access mask of each of a plurality of instructions.

16. The method of claim 9, further comprising granting access to the multiple bank data cache to multiple instructions that are not scheduled to access the same bank of the multiple bank data cache in the same time period.

17. A hardware system comprising:
a core to execute a plurality of instructions in a same time period; and
a conflict resolution circuit to detect multiple instructions scheduled to access a same bank of a multiple bank data cache in the same time period and to grant access priority to an instruction of the multiple instructions with a largest access width of the multiple bank data cache.

18. The hardware system of claim 17, wherein the conflict resolution circuit is to grant the access priority to the instruction scheduled to access a highest total of banks of the multiple bank data cache.

19. The hardware system of claim 17, wherein a queue entry for each of the multiple instructions include an access width value.

20. The hardware system of claim 17, wherein the conflict resolution circuit is to grant access priority to an earliest instruction when the multiple instructions are scheduled to access a same access width of the multiple bank data cache.

21. The hardware system of claim 20, wherein a queue entry for each of the multiple instructions include a relative program order.

22. The hardware system of claim 17, wherein an instruction of the multiple instructions that is not to be granted access priority is to be redispatched to the conflict resolution circuit.

23. The hardware system of claim 17, wherein the conflict resolution circuit is to detect the multiple instructions scheduled to access the same bank of the multiple bank data cache in the same time period by comparing a bank access mask of each of the plurality of instructions.

24. The hardware system of claim 17, wherein the conflict resolution circuit is to grant access to the multiple bank data cache to multiple instructions that are not scheduled to access the same bank of the multiple bank data cache in the same time period.

* * * * *